Jan. 11, 1966   H. C. FUNK   3,228,504
CONTROL ASSEMBLY FOR MOTOR AND REVERSING CLUTCHES
Filed Sept. 20, 1963                              5 Sheets-Sheet 1

INVENTOR.
H.C. Funk
BY William S. Dorman
ATTORNEY

Jan. 11, 1966          H. C. FUNK          3,228,504
CONTROL ASSEMBLY FOR MOTOR AND REVERSING CLUTCHES

INVENTOR.
H. C. Funk
BY
William S. Dorman
ATTORNEY

Jan. 11, 1966                 H. C. FUNK                3,228,504
            CONTROL ASSEMBLY FOR MOTOR AND REVERSING CLUTCHES
Filed Sept. 20, 1963                                 5 Sheets-Sheet 4

INVENTOR.
H. C. Funk
BY William S. Dorman
ATTORNEY

INVENTOR.
H. C. Funk
BY William S. Dorman
ATTORNEY

United States Patent Office 3,228,504
Patented Jan. 11, 1966

3,228,504
CONTROL ASSEMBLY FOR MOTOR AND
REVERSING CLUTCHES
Howard Clark Funk, Coffeyville, Kans., assignor to Funk
Mfg. Company, Coffeyville, Kans., a corporation of
Oklahoma
Filed Sept. 20, 1963, Ser. No. 310,306
5 Claims. (Cl. 192—.098)

This invention relates to a reversing clutch assembly and more particularly, but not by way of limitation, to a hydraulically controlled reversing clutch mechanism and a control lever assembly therefor. This invention is an improvement over my previous Patent No. 2,887,199, issued May 19, 1959, and entitled "Reversing Clutch Assembly."

The clutch mechanism disclosed in my aforementioned previously issued patent is a double clutch assembly comprising a forward clutch member and a reverse clutch member suitably geared to the engine of a vehicle, or the like, for providing forward and reverse directions of movement to the vehicle. A hydraulic valve member is provided for the clutch assembly, and is in communication with each of the clutch members in such a manner that hydraulic fluid is alternately supplied to the forward and reverse clutches for a separate actuation thereof. The flow of hydraulic fluid from the valve member is controlled by the reciprocation of the valve piston within the valve body. Thus, in one position of the piston member, fluid is supplied only to the forward clutch for actuation thereof, and in another position of the piston member, fluid is supplied only to the reverse clutch member. The piston member is reciprocated within the valve body by a control lever assembly which is actuated by means of a suitable hand operated throttle member or foot accelerator pedal member. The operation of the clutch assembly is controlled solely by the action of the throttle or accelerator member and the need for shifting of gears, or the like, is eliminated.

The present invention contemplates an improved control lever assembly for reciprocation of the piston member of the control valve for the double clutch mechanism and comprises a rocker device actuated by suitable foot pedals, or hand levers, wherein depression of one pedal rocks the assembly in a direction for movement of the valve piston to a position whereby the forward clutch member is engaged, and depression of a second pedal rocks the assembly in an opposite direction to cause engagement of the reverse clutch member. The speed of the engine is controlled solely by the actuation of the foot pedals, or hand levers, and thus the engine may be speeded up or slowed down to the desired operational speed by the amount of depression of the foot pedals. In addition, a simultaneous depression of both pedals precludes engagement of either the forward or reverse clutch members and maintains the clutch mechanism in a neutral position wherein auxiliary equipment, such as a loader mechanism, for lift device, or the like, may be operated without engagement of the clutching mechanism. The speed of operation of the auxiliary equipment may be controlled by the utilization of the foot pedals in the same manner as the speed of the engine.

The novel control assembly is particularly designed and constructed for precluding switching from one clutch engagement position to another clutch engagement position during actuation of the preselected foot pedal. An inhibitor device is provided whereby the desired clutch engagement may be preselected in the idle position only, and the preselected position is maintained throughout the particular operation until the device is returned to the idle position. The control lever assembly permits the selection of substantially any desired speed in the forward direction, reverse direction, or neutral setting, but is particularly arranged for precluding selection of clutching engagement positions except in the idle speed or position thereof.

It is an important object of this invention to provide a novel control lever device for the actuation of a double clutch mechanism.

It is another object of this invention to provide a novel control lever device for the actuation of a double clutch assembly whereby forward, reverse and neutral position of the clutch may be provided without the shifting of gear between the variable drive positions.

Another object of this invention is to provide a novel control lever device for a clutch assembly wherein the actuation of the clutch is accomplished solely by the control lever device.

Still another object of this invention is to provide a novel control lever device for a clutch assembly wherein the speed of the vehicle associated with the clutch assembly is controlled by the actuation of the control lever device.

A further object of this invention is to provide a novel control lever assembly for a double clutch mechanism wherein switching of the clutch engagement between the forward, reverse and neutral positions may be accomplished only in the idle position of the control lever assembly.

A still further object of this invention is to provide a novel control lever assembly for a double clutch mechanism which is simple and efficient in operation and economical and durable in construction.

Other objects and advantages of the invention will be evident from the following detailed description, read in conjunction with the accompanying drawings, which illustrate my invention.

Figure 1:
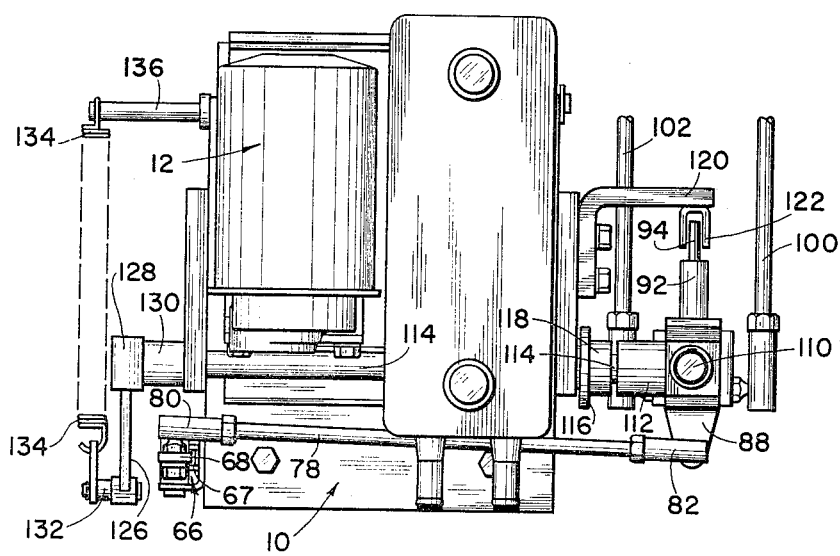
FIGURE 1 is a plan view of a double clutch mechanism having a control lever assembly embodying the invention in association therewith.

Referring to the drawings in detail, reference character 10 refers in general to a double clutch mechanism including a forward clutch member (not shown) and a reverse clutch member (not shown) The reverse and forward clutch members are preferably suitable hydraulically actuated clutch members as depicted in my aforementioned previously issued Patent No. 2,887,199. A suitable pump assembly, generally indicated at 12, is secured to the clutch mechanism 10 to provide an adequate supply of hydraulic fluid (not shown) for the clutch members, as is well known. A two-way or slide valve 14 is suitably secured in association with the double clutch mechanism 10 to provide communication between the pump 12 and clutch 10 whereby the hydraulic fluid may be directed to either the forward or reverse clutch members, or recirculated to the pump without actuation of either clutch member, as will be hereinafter set forth in detail.

Figure 7:
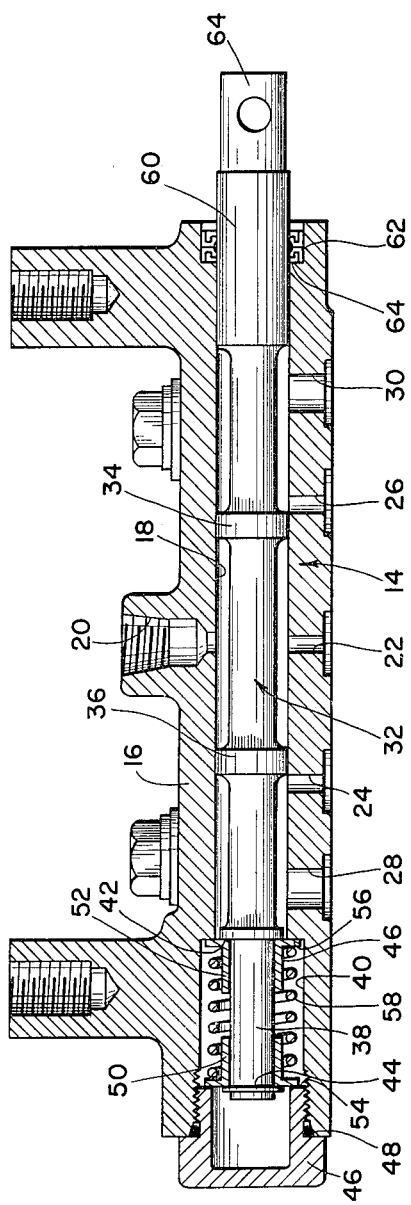
FIGURE 7 is a sectional elevational view of a valve utilized in the invention.

Referring now to FIGURE 7, the valve 14 may be of any suitable type, and as depicted herein comprises an outer housing 16 having a bore 18 extending longitudinally therethrough. A passageway or port 20 provides communication between the interior of the pump 12 and the bore 18 whereby the pump 12 supplies a flow of fluid to the valve 14. A passageway or port 22 directs the hydraulic fluid from the bore 18 back to the pump 12 for recirculation of the fluid, as is well known.

A port 24 is spaced from the port 22 and provides communication between the bore 18 and the forward clutch member of the clutch mechanism 10, and a similar port 26 is spaced from the bore 22 and oppositely disposed from the bore 24 to provide communication between the bore 18 and the reverse clutch member. A pair of exhaust ports 28 and 30 are spaced on the opposite sides of the bores 24 and 26, respectively, to exhaust the fluid from the bore 18 during operation of the valve 14, as will be hereinafter set forth. A reciprocal piston 32 is slidably disposed within the bore 18 for diverting the flow of fluid through the valve 14, as is well known.

The piston 32 is provided with a pair of spaced land portions 34 and 36 whereby movement of the piston 32 in a right hand direction, as viewed in FIGURE 7, establishes communication between the inlet bore 20 and the port 26 for directing fluid to the reverse clutch member for engagement thereof. Conversely, communication is established between the inlet port 20 and the port 24 when the piston is moved in a left hand direction whereby the fluid is directed to the forward clutch member for engagement thereof. It will be apparent that in the neutral or centered position of the piston 32, as shown in FIGURE 7, there is no communication between the inlet bore 20 and either of the bores 24 and 26, thus, precluding engagement of either the forward or reverse clutch members.

One end 38 of the piston 32 is of a slightly reduced diameter and extends through an enlarged bore portion 40 provided adjacent one end of the housing 16 and in communication with the bore 18. The end portion 38 is separated from the remaining portion of the piston 32 by an outwardly extending annular shoulder portion 42 and a second annular shoulder portion 44 is spaced from the shoulder 42 for a purpose as will be hereinafter set forth. An end cap 46 is threadedly secured in the open end of the enlarged bore 40 and a suitable sealing ring 48 is preferably interposed between the cap 46 and body 16 for precluding leakage of fluid therebetween. A pair of substantially identical oppositely disposed flanged sleeves or spacers 50 and 52 are slidably disposed around the end portion 38. In the neutral or centered position of the piston 32, the flanged sleeve 50 is disposed in abutting relationship with the shoulder 44 and inner end 54 of the cap 46 and the sleeve 52 is disposed in abutting relationship with the shoulder 42 and inner end portion 56 of the bore 40. A suitable spring 58 is disposed around the spacers 50 and 52 and constantly urges the spacers in opposite directions. As clearly shown in FIGURE 7, it will be apparent that the inner ends of the spacers 50 and 52 are slightly spaced apart in the neutral position of the piston 32 whereby engagement therebetween will limit the movement of the piston 32 in the bore 18 in either longitudinal direction.

When the piston 32 is moved within the bore 18 in a right hand direction, as viewed in FIGURE 7, the shoulder 44, being in engagement with the sleeve 50, moves the sleeve 50 against the pressure of the spring 58 and since the sleeve 52 can not move in a right hand direction because of the engagement with the sleeve 56, the sleeve 50 is moved in a direction toward the sleeve 52. The length of travel of the piston 32 in the right hand direction is limited by the engagement between the sleeve 50 and 52. Conversely, when the piston 32 is moved in a left hand direction the sleeve 50 remains stationary due to the engagement with the end 54 of the cap 56 and the sleeve 52 is moved in a direction toward the sleeve 50 by the shoulder 42. The left hand movement of the piston 32 is also limited by the engagement of the sleeves 52 and 50.

The opposite end 60 of the piston 32 is preferably of a diameter complementary to the bore 18 and reciprocates therein during operation of the valve piston 32. A suitable oil seal 62 is disposed in an annular groove 64 provided adjacent the outer end of the bore 18 for precluding leakage of fluid between the end portion 60 and body 16 and to provide lubrication therebetween. A longitudinally extending apertured flange 64 is provided on the outer extremity of the end portion 60 for connection with a suitable bell crank mechanism, generally indicated at 66 (FIGURE 2), and which is utilized for reciprocating the piston 32 in the bore 18.

The bell crank 66 may be of any suitable type and as depicted herein comprises a link member 67 pivotally secured at the opposed ends thereof between the flange 64 and a second link member 68. The link member 68 is pivotally connected at 70 to a bracket 72 carried by the clutch mechanism 10. The second link member 68 is further pivotally secured at its opposite end 76 to a movable rod 78 for a purpose as will be hereinafter set forth. From an inspection of FIGURE 2, it will be apparent that longitudinal movement of the rod 78 in one direction will actuate the bell crank mechanism 66 for moving the piston 32 longitudinally in one direction within the bore 18. Conversely, movement of the rod 78 longitudinally in an oppositely direction will move the piston 32 in an opposite direction within the bore 18.

The rod 78 may be a single or unitary member or, as depicted herein, may be provided with end members 80 and 82 threadedly secured on the opposite ends thereof whereby the overall length of the rod 78 may be adjusted as desired. The rod 78 extends in a right hand direction from the bell crank, as viewed in FIGURES 1 and 2, and is pivotally secured to a control lever assembly, generally indicated at 84, which is operable for movement of the rod 78 in alternate longitudinal directions for actuation from the valve 14.

Figure 4:
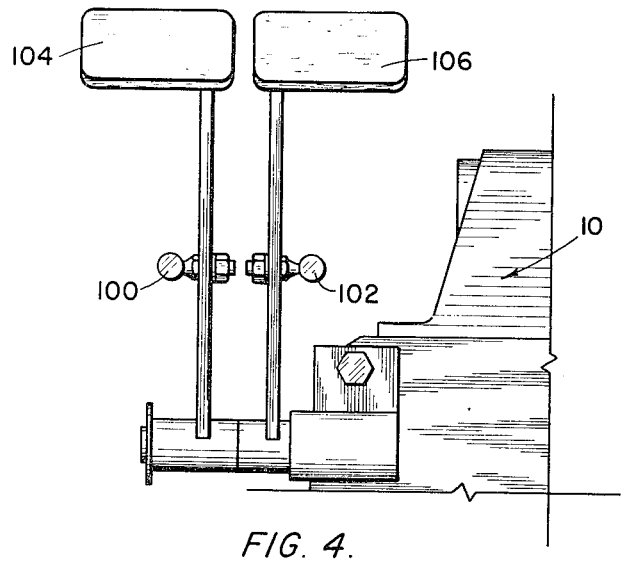
FIGURE 4 is a front elevational view of the foot pedal members for actuation of the control lever assembly.
Figure 5:
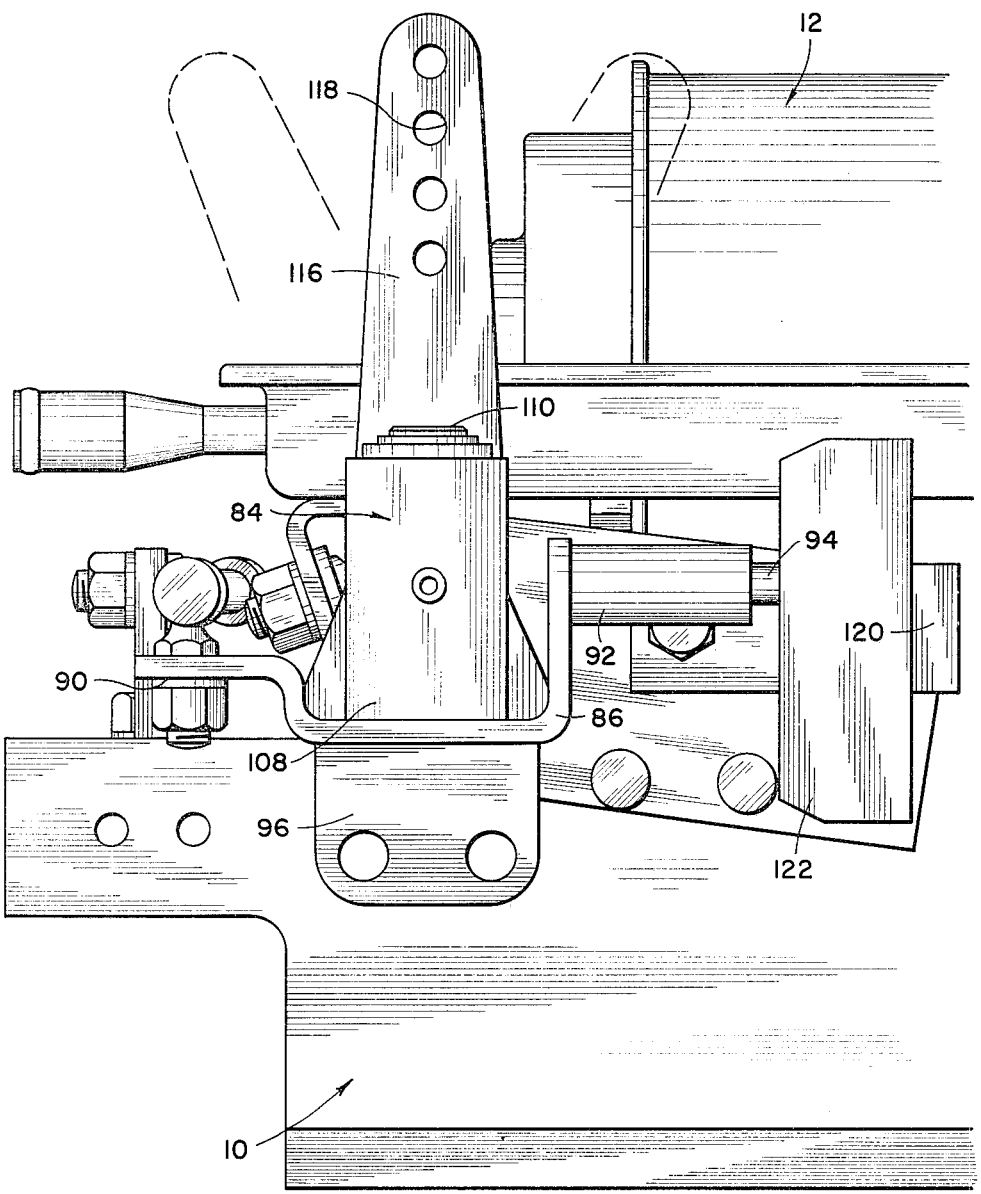
FIGURE 5 is an enlarged side elevational view of a control lever assembly embodying the invention, with alternate operating positions depicted in dotted lines.
Figure 6:
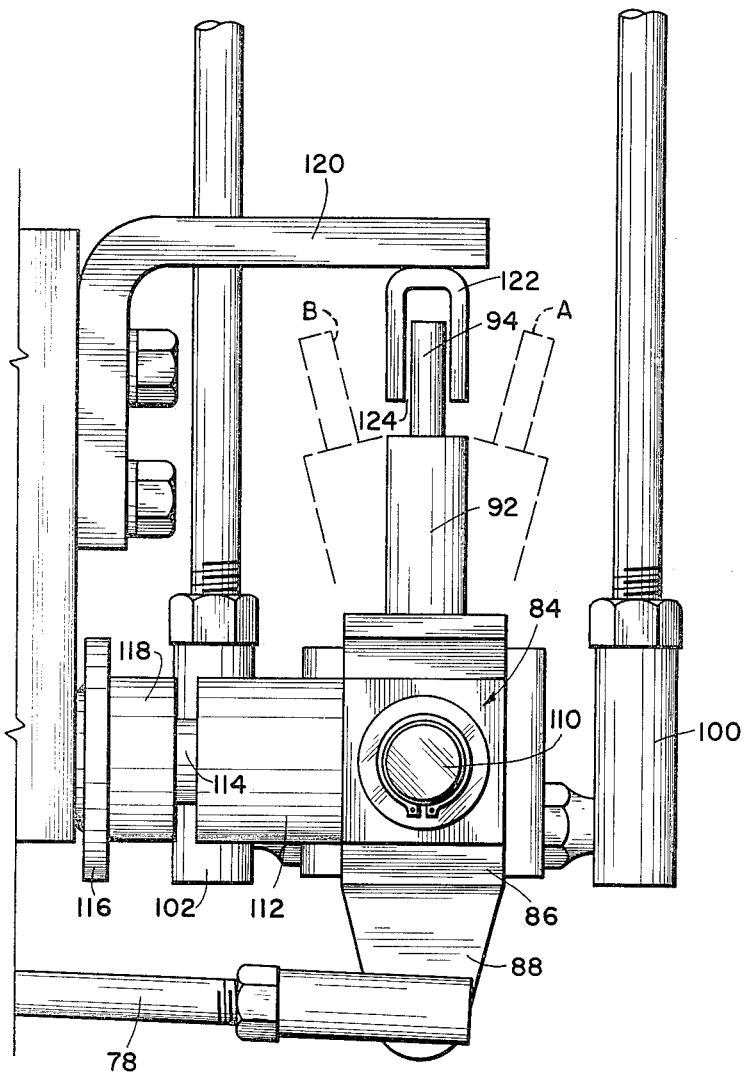
FIGURE 6 is an enlarged plan view of a control lever assembly embodying the invention, with alternate operating positions depicted in dotted lines.

Referring now to FIGURES 5 and 6, the control lever assembly 84 comprises a substantially U-shaped bracket 86 having an apertured flange member 88 projecting outwardly therefrom in a direction toward the rod 78. The flange 88 is pivotally secured to the rod 78 in any suitable manner at 90. An arm member 92 having a guide finger 94 carried thereby is suitably secured to the bracket 86 and extends therefrom in an opposite direction with respect to the flange 88. A pair of oppositely disposed side flanges 96 and 98 extend downwardly from the bracket 86 for receiving or supporting substantially identical connecting rods 100 and 102, respectively. The rods 100 and 102 extend from the flanges 96 and 98 in a direction away from the flange 88 and are provided with suitable foot pedals 104 and 106, respectively (FIGURE 4), for a purpose as will be hereinafter set forth. A housing 108 is carried by the bracket 86 and extends upwardly therefrom, as clearly shown in FIGURE 5. The housing 108 is journalled on a shaft 110 in any suitable manner for rotation thereabout in a horizontal plane. A sleeve 112 extends outwardly from the housing 108 and is suitably pinned or keyed to a shaft 114 which is journalled in the clutch mechanism 10. Thus, rotation of the housing 108, in a vertical plane, as will be hereinafter set forth, transmits rotation to the shaft 114. The connecting rods 100 and 102 are pivotally secured to the downwardly extending flanges 96 and 98 in any well known manner whereby the control lever assembly 84 may be rotated in a vertical plane during operation thereof.

Figure 2:
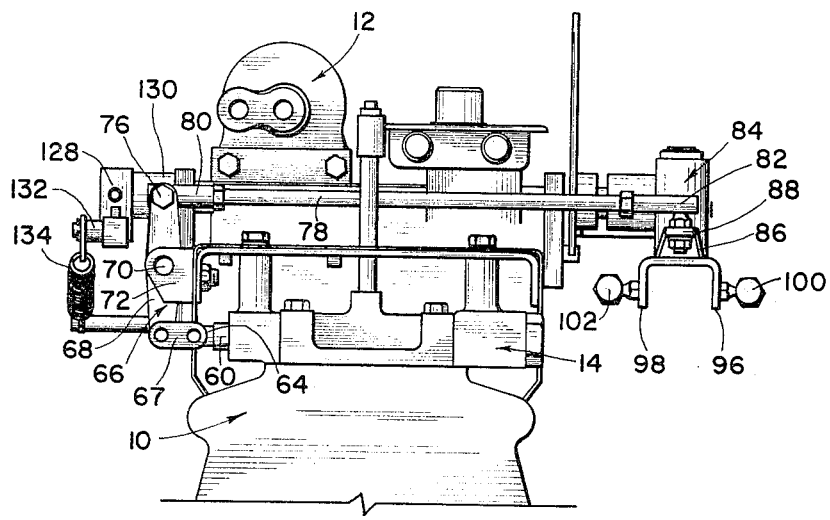
FIGURE 2 is an end elevational view of a double clutch mechanism having a control lever assembly embodying the invention secured thereto.

An upwardly extending arm member 116 is carried by a sleeve 118 which is spaced from the sleeve 112 and is suitably pinned or keyed to the shaft 114 for rotation simultaneously therewith. The arm 116 is provided with a plurality of longitudinally spaced apertures 118 for a purpose as will be hereinafter set forth. The shaft 114 extends through the clutch mechanism 10, as shown in FIGURES 1 and 2, and it will be apparent that the arm 116 may be similarly secured to the opposite end thereof, if desired, to achieve the same results.

A substantially L-shaped bracket 120 is secured to the clutch mechanism 10 in any suitable manner and extends outwardly therefrom for supporting a substantially U-shaped bracket member 122. The bracket member 122 is positioned in such a manner that the open end 124 thereof extends in a direction toward the device 84 to receive the pin 94 therein during operation of the control lever assembly 84. It will be apparent that rotation of the lever assembly 84 about the pin 110 will alter the position of the finger 94 with respect to the channel 122, as shown in dotted lines in FIGURE 6. Of course, the flange 88 will move simultaneously with the movement of the finger 94 for transmitting movement to the rod 78. In addition, rotation of the lever assembly 84 in a vertical plane will rotate the shaft 114 and alter the position of the arm 116, as shown in dotted lines in FIGURE 5.

The arm 116 is connected with a suitable carburetor (not shown), or the like, in any well known manner. It will be apparent that the apertures 118 provide for an adjustability of the connection between the arm 116 and the carburetor to provide the most desirable operation for the carburetor. Rotation of the arm 116 regulates the supply of fuel from the carburetor to the vehicle engine (not shown) in order to control the speed thereof as desired. Rotation of the lever arm 116 in one direction will increase the flow of fuel to the engine and rotation thereof in an opposite direction will decrease the flow of fuel to the engine.

It will be apparent that the control lever assembly 84 may be secured to the opposite end of the shaft 114, if desired, and there is no intention to limit the invention to the particular disposition thereof depicted herein.

As hereinbefore set forth, the shaft 114 preferably extends through the clutch mechanism 10. An arm member 126 is secured to the outer end of the shaft 114 oppositely disposed from the device 84 by a suitable collar 128 and is spaced from the clutch 10 by a spacer sleeve 130. The collar 128 and sleeve 130 are pinned or keyed to the shaft 114 for simultaneous rotation therewith. A spring support element 132 is carried at the outer extremity of the arm 126 for receiving one end of a spring 134, as particularly shown in FIGURES 1 and 2. The opposite end of the spring 134 is anchored to an outwardly extending arm 136 which is spaced from the shaft 114 and secured to the clutch mechanism in any suitable manner (not shown). The spring 134 is particularly selected to be of a type requiring greater pressure or force for expanding thereof than is required to overcome the pressure of the spring 58 provided in the valve 14 for compression thereof. This is to assure an efficient actuation of the clutch mechanism 10 by the control lever device 84, as will be hereinafter set forth. It will be apparent that the spring 134 constantly urges the shaft 114 in a rotational direction for maintaining the arm 116 in a normal position inclined toward the carburetor or in the position shown in FIGURE 3.

Operation

Figure 3:
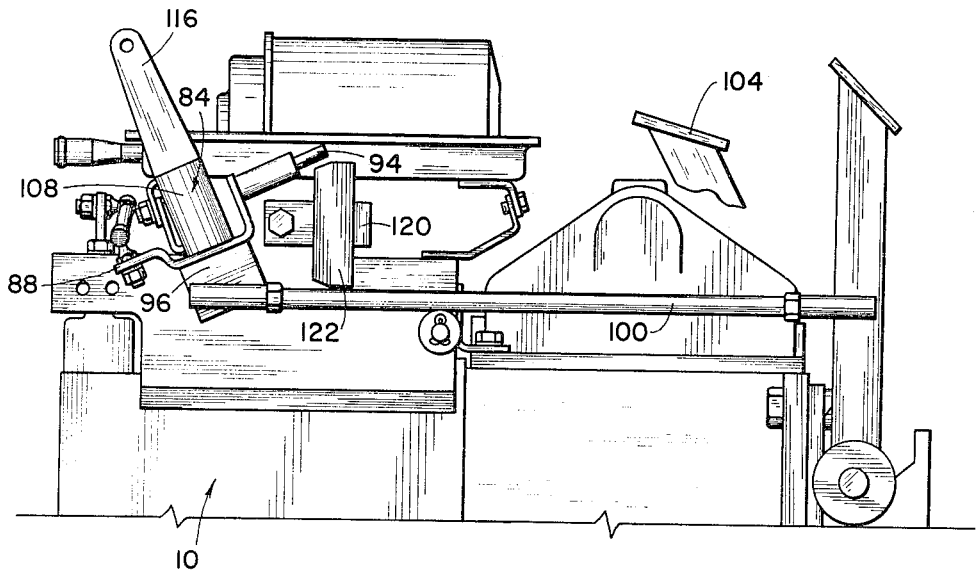
FIGURE 3 is a side elevational view of a double clutch mechanism provided with a control lever assembly embodying the invention.

The operation of the double clutch mechanism 10 and the engine (not shown) in association therewith is controlled solely by the operation of the foot pedals 104 and 106. Of course, it will be apparent that hand levers may be provided in lieu of the foot pedals shown herein. As hereinbefore set forth, the arm 116 is maintained by the spring 134 in a normally inclined position as shown in FIGURE 3 wherein the finger 94 is out of engagement with the channel 122.

When the lever or pedal 104 is depressed or moved in a direction toward the control lever device 84, the connecting rod 100, being carried by the flange 96, pivots or swivels the device 84 about the pin 110 in a clockwise direction, as viewed in FIGURES 1 and 6. This swivel movement moves the flange 88 in a clockwise or left hand direction and the finger 94 in a right hand direction to the position A, shown in dotted lines in FIGURE 6. The left hand movement of the flange 88 moves the rod 78 in a left hand direction whereby the bell crank 66 is actuated for moving the piston 32 within the valve 14. The piston 32 is moved in a left hand direction, as viewed in FIGURE 7, for establishing communication between the inlet port 20 and the port 24 whereby fluid from the pump 12 is directed to the forward clutch member (not shown) for engagement thereof. As hereinbefore set forth, the longitudinal movement of the piston 32 within the bore 18 is limited by the engagement between the spacer members 50 and 52.

With the forward clutch member engaged, the guide finger 94 is disposed adjacent the right hand outer edge of the channel 122, as shown in position A in FIGURE 6. The engagement between the channel 122 and the finger 94 locks or maintains the piston in position for directing the fluid to the forward clutch until the control lever 84 is actuated for being returned to an idle or neutral position as will be hereinafter set forth.

When the piston 32 can no longer move in a left hand direction, the pedal 104 may be further depressed to overcome the pressure of the spring 134 whereby the entire control lever assembly 84 is rotated through a vertical plane for rotating the shaft 114. Since the spring 134 is stronger than the spring 58, there is no possibility of rotation of the device 84 in the vertical plane until the piston 32 has reached the limit of its movement within the bore 18. As the shaft 114 is rotated by the device 84, the arm 116 is rotated to variable positions, as indicated in dotted lines in FIGURE 5. Since the arm 116 is connected with the carburetor (not shown), the supply of fuel to the engine is regulated by the position of the arm 116. Thus, the speed of the engine in the forward position may be controlled by the positioning of the foot pedal 104.

When it is desired to engage the reverse clutch member (not shown) the foot pedal 106 may be depressed or moved toward the control lever device 84. Depression of the foot pedal 106 will rotate or swivel the device 84 in a counter clockwise direction, as viewed in FIGURES 1 and 6. The counter clockwise rotation of the control lever assembly 84 moves the flange 88 in a right hand direction and the finger 94 in a left hand direction. This right hand movement of the flange 88 moves the rod 78 in a right hand direction for actuation of the bell crank 66 to move the piston 32 in a right hand direction within the bore 18. Here again, the right hand movement of the piston is limited by the engagement between the spacer members 50 and 52. This establishes communication between the bore 20 and the port 26 whereby oil may be supplied from the pump 12 to the reverse clutch member for engagement thereof.

When the piston has reached the limit of its movement, a continued depression of the foot pedal 106 will rock or pivot the device 84 for rotating the shaft 114 to overcome the pressure of the spring 134. This rocking or pivotal movement of the control lever device 84 moves the arm 116 substantially identically with the rocking motion produced by actuation of the pedal 104. Thus, the speed of the engine may be controlled in the reverse direction by the positioning of the pedal 106. When the piston 32 is in the reverse position, the finger 94 is disposed adjacent the left hand edge portion of the channel 122 to position B shown in dotted lines in FIGURE 6. The engagement between the channel 122 and the finger 94 maintains the piston in the reverse position until the control device 84 is returned to the idle or neutral position.

The spring 58 in the valve 14 constantly urges the flanged spacer members 50 and 52 in opposite directions or away from each other for maintaining the piston 32 centered or in a neutral position within the bore 18. When the piston 32 is in the neutral position, the pin member 94 is in alignment with the interior of the channel 122, as particularly shown in solid lines in FIGURE 6. When it is desired to maintain the clutch mechanism in a neutral position with neither the reverse or forward clutch members engaged and to simultaneously increase or vary the speed of the engine, both pedals 104 and 106 may be depressed together. This is preferably accomplished by engaging the pedals simultaneously with one of the operator's feet. The pin 94 will ride within the channel 122, thus, precluding reciprocation of the piston 32 within the bore 18. The engagement of the finger 94 in the channel 122 also precludes pivoting of the device 84 about the pin 110. Thus, a continued depression of both the pedals 104 and 106 will overcome the pressure of the spring 134 and rock the assembly 84 about the shaft 114. Here again, the rocking movement of the assembly 84 moves the arm 116 for regulating the supply of fuel from the carburetor to the engine. In this manner, the engine may be utilized as a source of power for auxiliary equipment, such as loader devices, fork lifts, or the like (not shown), without engagement of the reverse or forward clutch members.

From the foregoing, it will be apparent that the present invention provides a novel control lever assembly for actuation of a double clutch mechanism wherein actuation or depression of one foot pedal or hand lever pivots the control device in a direction for operation of the control valve to engage the forward clutch member. Continued depression of the foot pedal regulates the speed of the engine and the valve is positively maintained in the forward position until such a time that the control lever assembly is returned to the neutral or idling position. Actuation of a second foot pedal pivots the control lever assembly for regulation of the valve to provide engagement of the reverse clutch member and the valve is positively maintained in this reverse position until the control lever assembly is returned to the neutral position. Simultaneous actuation of both foot pedals actuates the control lever assembly for maintaining the valve in a neutral position whereby neither the forward or reverse clutch is engaged. The speed of the engine in all positions, forward, reverse and neutral may be controlled by the positioning of the foot levers. In addition, a mechanical inhibitor device is provided for maintaining the clutch mechanism securely locked in the preselected forward, reverse or neutral position, thus, precluding shifting of positions except in the neutral or idling position. The novel control lever assembly is simple and efficient in operation and economical and durable in construction.

Changes may be made in the combination and arrangement of parts as heretofore set forth in the specification and shown in the drawings, it being understood that any modification in the precise embodiment of the invention may be made within the scope of the following claims, without departing from the spirit of the invention.

What is claimed is:

1. A control lever assembly for a double clutch mechanism for an engine comprising support bracket means rotatably mounted on the clutch mechanism, means carried by the bracket means to provide for pivoting thereof in one plane, means carried by the clutch mechanism for rotating the support bracket means in a plane substantially perpendicular to the first mentioned plane, means cooperating with the support bracket means for selective actuation of the double clutch mechanism to provide alternate forward and reverse and neutral positions therefor upon pivoting of the control lever assembly in the first mentioned plane, means cooperating with the control lever assembly upon rotation thereof in said second mentioned plane whereby the supply of fuel to the engine is controlled for regulating the speed thereof, and means carried by the bracket for precluding shifting from the forward or reverse or neutral positions of the clutch except in an idling position of the engine.

2. A control lever assembly for a double clutch mechanism for an engine comprising a shaft journalled in the double clutch mechanism, a rocker assembly secured adjacent one end of the shaft for rotation thereof, pivot means supporting the rocker assembly for pivoting in a plane substantially perpendicular to the rotational plane of the shaft, a control valve assembly secured to the double clutch mechanism, lever means connecting the rocker assembly with the control valve assembly for actuation thereof whereby the clutch mechanism may be actuated to provide alternate forward and reverse and neutral positions thereof, mechanical inhibitor means cooperating with the rocker assembly to preclude switching of the preselected forward or reverse or neutral positions of the double clutch mechanism except in the idling position of the engine, means carried by the shaft for controlling the supply of fuel to the engine for regulating the speed thereof in any position of the double clutch mechanism, and means in connection with the rocker assembly for independent pivoting and rotating thereof for actuation of the control valve and fuel supply means.

3. In combination with a double clutch mechanism for an engine, a shaft journalled in the double clutch mechanism, a rocker assembly carried by the shaft for rotation thereof, means carried by the shaft for regulating the supply of fuel to the engine for control of the speed thereof upon rotation of the shaft, swivel means provided in the rocker assembly for swivelling thereof in a plane substantially parallel to the axis of the shaft, a control valve carried by the clutch mechanism for actuation thereof to provide alternate forward and reverse and neutral positions therefor, connecting means provided between the rocker assembly and control valve for actuation of the control valve, and means carried by the rocker assembly to provide independent swivelling and rotation thereof for controlling the actuation of the double clutch mechanism and the speed of the engine.

4. In combination with a double clutch mechanism for an engine, a shaft journalled in the double clutch mechanism, a rocker assembly carried by the shaft for rotation thereof, means carried by the shaft for regulating the supply of fuel to the engine for controlling the speed thereof upon rotation of the rocker assembly and shaft, swivel means provided in the rocker assembly for swivelling thereof in a plane substantially perpendicular to the rotational plane thereof, a control valve carried by the clutch mechanism for actuation thereof to provide alternate forward and reverse and neutral positions therefor, means connecting the rocker assembly with the control valve for actuation of the control valve, means provided for precluding a simultaneous swivelling and rotation of the rocker assembly, and means carried by the rocker assembly for independent swivelling and rotation thereof.

5. A control lever assembly for a clutch mechanism for an engine and comprising a support bracket member, housing means carried by the support bracket, pivot pin means carried by the support bracket to provide a pivoting of the housing means and support bracket in one plane, a shaft journalled in the clutch mechanism, means securing the housing means and support bracket to the shaft and rotatable in a second plane for transmitting rotation to the shaft, apertured flange means carried by the support bracket, a control valve secured to the clutch mechanism for actuation thereof to provide alternate positions of forward and reverse and neutral, connecting means extending between the apertured flange and control valve for actuation of the valve upon rotation of the housing means and support bracket in the second mentioned plane, a guide channel secured to the housing means, mechanical inhibitor means carried by the support bracket and cooperating with the guide channel to preclude switching of the clutch positions except in an idling position of the engine, means carried by the shaft and rotatable simultaneously therewith upon rotation of the housing means and support bracket in said first mentioned plane for controlling the supply of fuel to the engine for regulating the speed thereof, and pedal means carried by the support bracket for independent rotation of the housing means and support bracket in said first and second mentioned planes.

References Cited by the Examiner

UNITED STATES PATENTS

| | | | |
|---|---|---|---|
| 2,420,856 | 5/1947 | Brill et al. | 192—.098 |
| 2,524,487 | 10/1950 | Stevens | 192—.098 X |
| 2,588,650 | 3/1952 | Morse | 192—.098 |
| 2,620,909 | 12/1952 | Moon | 192—.098 |
| 2,804,782 | 9/1957 | Erxleben | 192—.098 X |
| 2,887,199 | 5/1959 | Funk | 192—.098 |
| 2,947,191 | 8/1960 | Waner | 192—.098 X |

DON A. WAITE, *Primary Examiner.*

DAVID J. WILLIAMOWSKY, *Examiner.*

BENJAMIN W. WYCHE, *Assistant Examiner.*